(12) United States Patent
Rainisto

(10) Patent No.: US 11,599,383 B2
(45) Date of Patent: Mar. 7, 2023

(54) CONCURRENT EXECUTION OF TASK INSTANCES RELATING TO A PLURALITY OF APPLICATIONS

(71) Applicant: Microsoft Technology Licensing, LLC, Redmond, WA (US)

(72) Inventor: Roope Rainisto, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/252,188

(22) Filed: Aug. 30, 2016

(65) Prior Publication Data
US 2018/0060116 A1  Mar. 1, 2018

(51) Int. Cl.
*G06F 9/46* (2006.01)
*G06F 9/48* (2006.01)
*G06F 3/04842* (2022.01)
*G06F 3/04847* (2022.01)

(52) U.S. Cl.
CPC .......... *G06F 9/485* (2013.01); *G06F 3/04842* (2013.01); *G06F 3/04847* (2013.01)

(58) Field of Classification Search
CPC ... G06F 9/485; G06F 3/04842; G06F 3/04847
See application file for complete search history.

(56) References Cited

U.S. PATENT DOCUMENTS

| | | | | |
|---|---|---|---|---|
| 6,182,046 | B1 * | 1/2001 | Ortega | G10L 15/22 704/272 |
| 7,124,373 | B1 | 10/2006 | Patil | |
| 2002/0140742 | A1 | 10/2002 | Lection et al. | |
| 2004/0194086 | A1 * | 9/2004 | Suzaki | G06F 9/4856 718/100 |
| 2006/0112354 | A1 | 5/2006 | Park et al. | |
| 2007/0157097 | A1 | 7/2007 | Peters | |
| 2007/0186176 | A1 | 8/2007 | Godley | |
| 2009/0217198 | A1 | 8/2009 | Jung | |
| 2010/0281481 | A1 | 11/2010 | Rainisto et al. | |
| 2011/0320977 | A1 | 12/2011 | Bahn et al. | |

(Continued)

FOREIGN PATENT DOCUMENTS

| | | |
|---|---|---|
| CN | 102368194 A | 3/2012 |
| CN | 102542410 A | 7/2012 |
| CN | 102866913 A | 1/2013 |

OTHER PUBLICATIONS

"Desktop Groups", Published on: Aug. 8, 2014, 3 pages, Available at http://www.macbed.com/desktop-groups-1-5-2/.
"How to Group your Apps on Start in Windows 10", Published on: Mar. 5, 2016, 14 pages, Available at: http://www.tenforums.com/tutorials/4476-start-group-your-apps-windows-10-a.html.
Ahmed, Waqas, "Group Multiple Applications By Task Under One Window With TaskSpace", Published on: Jan. 1, 2014, 5 pages, Available at: http://www.addictivetips.com/windows-tips/taskspace-group-multiple-applications-by-task-under-one-window/.

(Continued)

*Primary Examiner* — Wissam Rashid
(74) *Attorney, Agent, or Firm* — Barta, Jones & Foley, PLLC

(57) ABSTRACT

According to one aspect, there is provided an apparatus comprising at least one processing unit and at least one memory. The at least one memory stores program instructions that, when executed by the at least one processing unit, cause the apparatus to cause display of executed task instances relating to at least one application on a graphical user interface on a display, detect a storing command associated with the executed task instances, and store task information relating to the executed task instances in a task file in the at least one memory for later resumption of execution of the task instances.

20 Claims, 7 Drawing Sheets

(56) References Cited

U.S. PATENT DOCUMENTS

| | | | |
|---|---|---|---|
| 2012/0011511 A1* | 1/2012 | Horvitz | G06F 9/461 |
| | | | 718/100 |
| 2012/0227007 A1* | 9/2012 | Nicholson | G06F 9/451 |
| | | | 715/779 |
| 2013/0047198 A1 | 2/2013 | Srour et al. | |
| 2014/0089822 A1 | 3/2014 | Wu et al. | |
| 2016/0055039 A1* | 2/2016 | Boenisch | G06F 9/48 |
| | | | 718/107 |
| 2016/0112501 A1* | 4/2016 | Wheeler | H04L 67/104 |
| | | | 709/204 |
| 2016/0180844 A1* | 6/2016 | VanBlon | G10L 15/222 |
| | | | 704/275 |
| 2016/0328275 A1 | 11/2016 | Boenisch et al. | |
| 2017/0168667 A1* | 6/2017 | Jeon | G06F 3/16 |
| 2018/0260081 A1* | 9/2018 | Beaudoin | G06F 3/04817 |

OTHER PUBLICATIONS

"Group apps into desktops", Published on: Aug. 8, 2015, 2 pages, Available at: http://windows.microsoft.com/en-in/windows-10/getstarted-group-apps.

"International Search Report and Written opinion issued in PCT Application PCT/US2017/048091", dated Feb. 5, 2018, 16 Pages.

"Office Action Issued in European Patent Application No. 17768273.9", dated Feb. 18, 2020, 3 Pages.

"Office Action Issued in European Patent Application No. 17768273.9", dated Nov. 19, 2020, 6 Pages.

"Office Action Issued in Indian Patent Application No. 201847049854", dated Jul. 9, 2021, 6 Pages.

"First Office Action and Search Report Issued in Chinese Patent Application No. 201780053357.8", dated Nov. 30, 2022, 15 Pages.

\* cited by examiner

CONCURRENT EXECUTION OF TASK INSTANCES RELATING TO A PLURALITY OF APPLICATIONS

BACKGROUND

A multitasking operating system allows a user to run and launch multiple applications simultaneously. The operating system may also provide a view showing all the currently executed applications. If a user wishes to start a specific set of applications or application instances, the user has to separately launch each of the applications or instances.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, an apparatus is provided. The apparatus comprises at least one processing unit and at least one memory. The at least one memory stores program instructions that, when executed by the at least one processing unit, cause the apparatus to cause display of executed task instances relating to at least one application on a graphical user interface on a display, detect a storing command associated with the executed task instances, and store task information relating to the executed task instances in a task file in the at least one memory for later resumption of execution of the task instances.

In another embodiment, an apparatus is provided. The apparatus comprises at least one processing unit and at least one memory. The at least one memory stores program instructions that, when executed by the at least one processing unit, cause the apparatus to receive a selection of a task file comprising task information relating to previously executed task instances via a graphical user interface displayed on a display, provide a task view on the graphical user interface in response to the selection, the task view identifying task instances included in the task file, receive a command to resume execution of at least one task instance of the task instances, and resume execution of the at least one task instance in response to receiving the command based on the task information stored in the task file.

In another embodiment, an apparatus is provided. The apparatus comprises at least one processing unit and at least one memory. The at least one memory stores program instructions that, when executed by the at least one processing unit, cause the apparatus to obtain status data relating to at least one external system, cause display of executed task instances relating to at least one application and the status data relating to the at least one external system on a graphical user interface on a display, detect a storing command associated with the executed task instances and the status data relating to the at least one external system, and store task information relating to the executed task instances and the status data relating to the at least one external system in a task file in the at least one memory for later resumption of execution of the task instances and control of the at least one external system based on the status data.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

The term "task instance" or "application instance" is used to generally refer to an application executed by an apparatus. The application may be a system application or an application used by a user. If the application processes a specific file (for example, an image, a text document, an audio file), the task instance or application instance may refer both to the executed application and to the processed file.

The term "task file" is used to generally refer to a data object that includes information relating to multiple application or task instances. By opening a task file, it is possible to resume execution of some or all of the application or task instances included in the task file.

A multitasking operating system allows a user to run and launch multiple applications simultaneously. The operating system may also provide a view on a graphical user interface showing all the currently executed applications. If a user wishes to start a specific set of applications or application instances, the user has to separately launch each of the applications or instances. Thus, aspects of the disclosure enable storing data relating to executed application or task instances in a task file, and then later resuming execution of the application or task instances when opening the task file.

In at least some embodiments a solution is provided where currently executed task instances relating to at least one application are displayed on a graphical user interface. When a storing command associated with the executed task instances is detected, task information relating to the executed task instances is stored in a task file in the at least one memory. This enables a user to later resume execution of the task instances when opening the task file.

At least some of the embodiments enable a user to easily and intuitively store task instance information in a task file to enable the user to later resume execution of the same task instances stored in the task file. Further, at least some of the embodiments enable a user to easily and intuitively to resume where the user left off when using one or more application last time.

Figure 1:
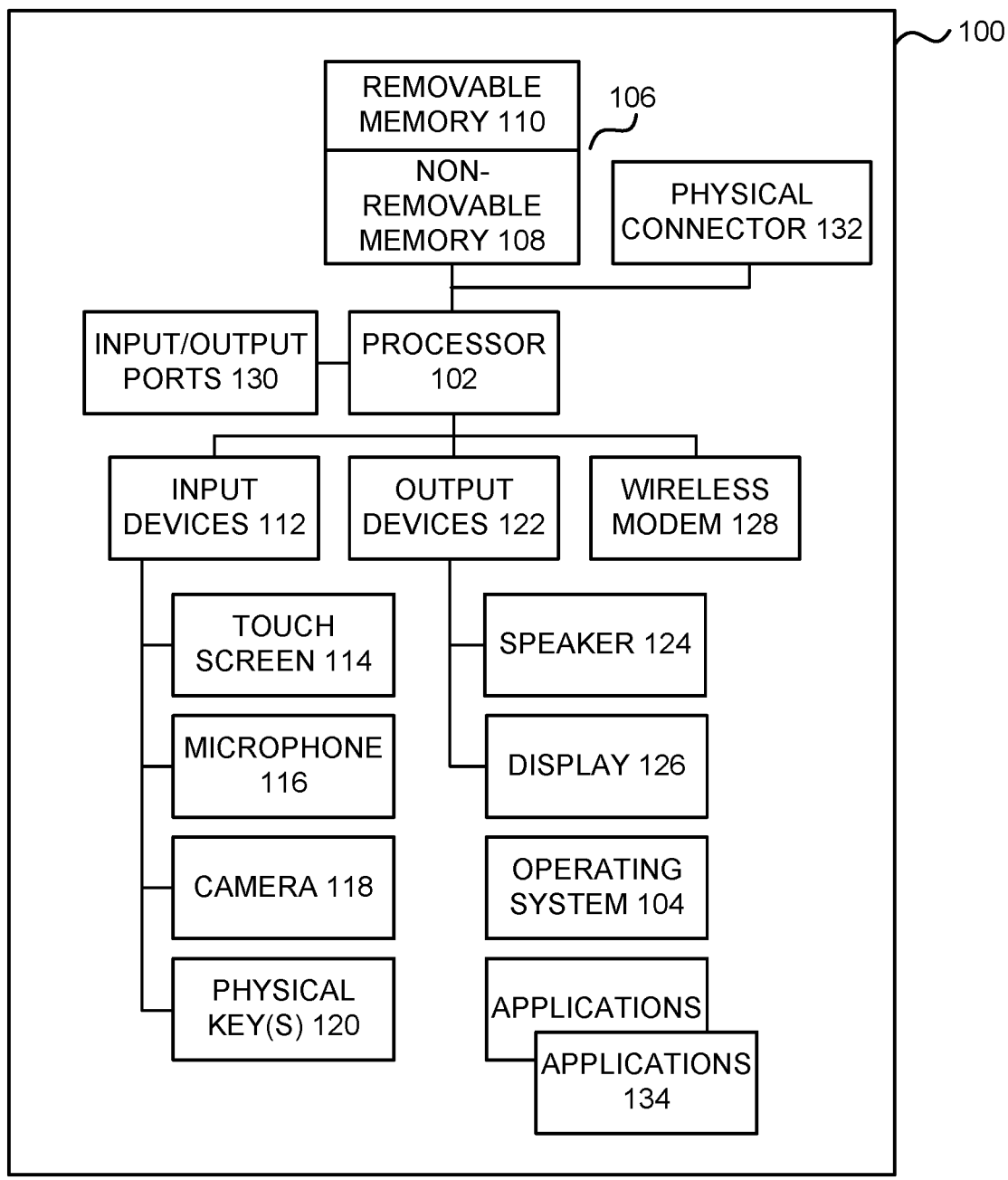
FIG. 1 is a system diagram depicting an apparatus including a variety of optional hardware and software components.

FIG. 1 is a system diagram depicting an apparatus 100 including a variety of optional hardware and software components. Any components in the apparatus 100 can communicate with any other component, although not all connections are shown, for ease of illustration. The apparatus 100 can be any of a variety of computing devices (for example, a cell phone, a smartphone, a handheld computer, a tablet computer, a laptop computer, a personal computer, a Personal Digital Assistant (PDA), a server computer, a network server etc.).

The illustrated apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components and support for one or more application programs 134. The application programs can include common mobile computing applications (e.g., email applications, calendars, contact managers, web browsers, messaging applications), or any other computing application.

The illustrated apparatus 100 can include a memory 106. The memory 106 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in mobile communication systems, or other well-known memory storage technologies, such as "smart cards". The memory 106 can be used for storing data and/or code for running the operating system 104 and the applications 134. If the apparatus 100 is a mobile phone or smart phone, the memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 100 can support one or more input devices 112, such as a touchscreen 114, microphone 116, camera 118 and/or physical keys or a keyboard 120 and one or more output devices 122, such as a speaker 124 and a display 126. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 134 can comprise speech-recognition software as part of a voice user interface that allows a user to operate the apparatus 100 via voice commands. Further, the apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with the mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The apparatus 100 can further include at least one input/output port 130 and/or a physical connector 132, which can be a USB port, a USB-C port, IEEE 1394 (FireWire) port, and/or RS-232 port. The illustrated components are not required or all-inclusive, as any components can be deleted and other components can be added.

Figure 2A:
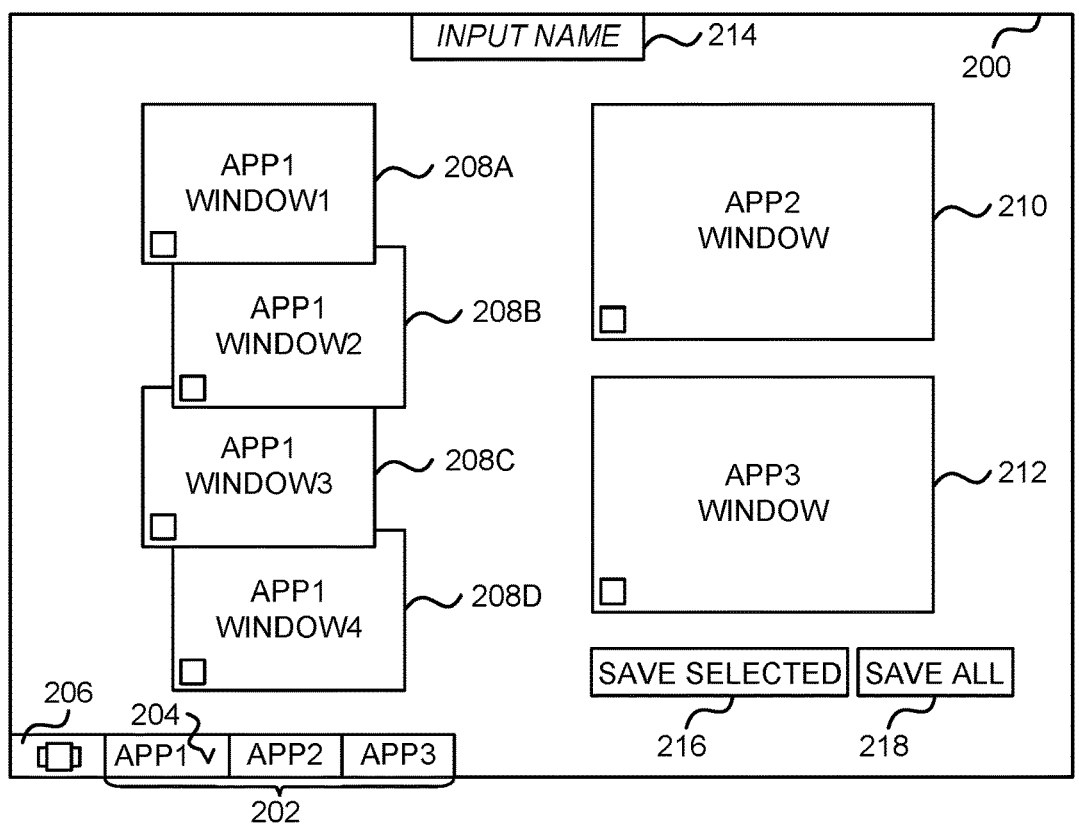
FIG. 2A is a simplified graphical user interface view on a display of an apparatus for storing task information according to one embodiment.

Any combination of the illustrated components disclosed in FIG. 1, for example, at least one of the processor 102 and the memory 106 may constitute means for causing display of executed task instances relating to at least one application on a graphical user interface, means for detecting a storing command associated with the executed task instances, and means for storing task information relating to the executed task instances in a task file in the at least one memory to enable a user to later resume execution of the task instances. Further, any combination of the illustrated components disclosed in FIG. 1, for example, at least one of the processor 102 and the memory 106 may constitute means for receiving selection of a task file comprising task information relating to previously executed task instances, means for providing a task view on a graphical user interface in response to the selection, the task view identifying task instances included in the task file, means for receiving a command to resume execution of at least one task instance of the task instances, and means for resuming execution of the at least one task instance in response to receiving the command based on the task information stored in the task file. Further, any combination of the illustrated components disclosed in FIG. 1, for example, at least one of the processor 102 and the memory 106 may constitute means for obtaining status data relating to at least one external system, means for causing display of executed task instances relating to at least one application and the status data relating to the at least one external system on a graphical user interface, means for detecting a storing command associated with the executed task instances and the status data relating to the at least one external system, and means for storing task information relating to the executed task instances and the status data relating to the at least one external system in a task file in the at least one memory to enable a user to later resume execution of the task instances and control the at least one external system based on the status data FIG. 2A is a simplified graphical user interface view 200 on a display of an apparatus for storing task information according to one embodiment. The apparatus is, for example, a mobile device, a smart phone, a laptop computer, or a personal computer. FIG. 2A illustrates some exemplary objects that an operating system of the apparatus may display. The graphical user interface view 200 may comprise a task bar 202 indicating applications that are currently being executed. An indicator 204 in relation to an application in the task bar 202 may indicate that there are multiple instances of the application open simultaneously.

In FIG. 2A, the graphical user interface view 200 comprises a multitasking view button 206, which when selected, may cause display of executed application or task instances 208A-208D, 210, 212 in the graphical user interface. For example, if the application or task instances 208A-208D relate to word processing documents, each of the application or task instances 208A-208D relate to a different word processing document. On the other hand, if the application or task instances 208A-208D relate to a web browser application, each of the application or task instances 208A-208D represent a separate web browser application window that may include one or more active tabs.

The graphical user interface view 200 may also provide an input field 214 for a user to input a name for a task file to be created. Fox example, if the application or task instances all relate to a single subject, the user may name the task file according to the subject, for example, "summer holiday plans". The user may also be provided a possibility 216 of choosing only some of the application or task instances 208A-208D, 210, 212 to be included in the task file to be created. The desired application or task instances may be chosen by checking check boxes of each of the application or task instances. The user may also be provided a possibility 218 of including all the application or task instances 208A-208D, 210, 212 in the task file to be created. In another embodiment, no separate buttons 216 and 218 are provided and the task file automatically includes all the application or task instances 208A-208D, 210, 212 after the user has input the desired name for the task file. In one embodiment, no separate name input field is provided, and when the user selects "SAVE SELECTED" 216 or "SAVE ALL" 218, the user is given the possibility of choosing a name and a storing location for the task file.

The solution illustrated in FIG. 2A enables a user to store a specific set of task instances to a task file for later user. For example, if a user is working on a specific project, the user is able to store various task instances of one or more applications relating to the projects in a task file. When the user wishes to resume working on the project, the user only needs to open the task file and all the task instances stored in the task file are opened. Thus the user does not have to separately start each of the task instances.

Figure 2B:
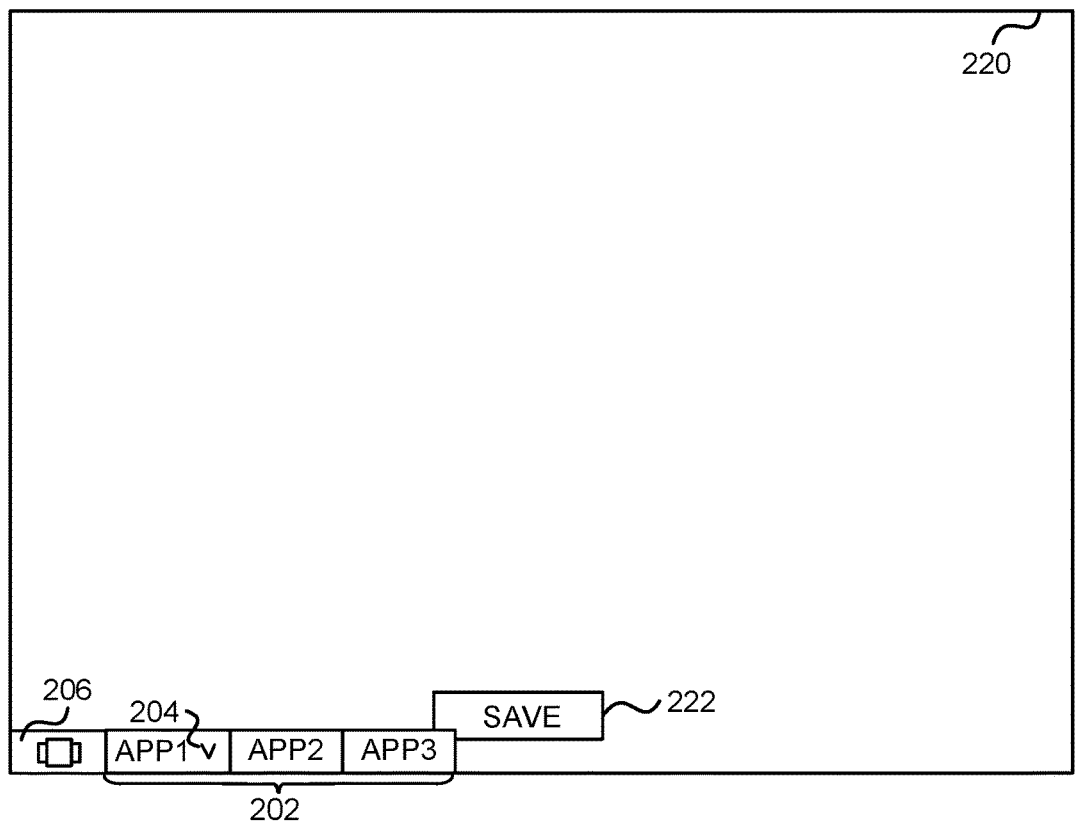
FIG. 2B is a simplified graphical user interface view on a display of an apparatus for storing task information according to another embodiment.

FIG. 2B is a simplified graphical user interface view 220 on a display of an apparatus for storing task information according to one embodiment. FIG. 2B illustrates some exemplary objects that an operating system of the apparatus may display. The apparatus is, for example, a mobile device, a smart phone, a laptop computer, or a personal computer. The graphical user interface view 220 may comprise a task bar 202 indicating applications that are currently being executed. An indicator 204 in the task bar 202 may indicate that there are multiple instances of the application open simultaneously.

FIG. 2B illustrates another solution for a user to store in a task file currently executed application or task instances. The user may initiate a storing function, for example, by right-clicking with a mouse or by a long press on a touch-sensitive display on one of the task bar 202 items or elsewhere on the graphical user interface view 220 to save 222 all currently executed application or task instances in a task file. In one embodiment, the user is provided with an input dialog to select a name and a storing location for the task file. In another embodiment, the user may be provided with the view 200 illustrated in FIG. 2A FIGS. 2A and 2B illustrated that the user may initiate the storing process of the application or task instances 208A-208D, 210, 212 by selecting the multitasking view button 206 or by initiating a storing function, for example, by right-clicking with a mouse or by a long press on a touch-sensitive display on one of the task bar 202 items or elsewhere on the graphical user interface view 220. In another embodiment, the user may provide a voice command, for example, "store task instances". After that, the user may be provided with the graphical user interface view 200 including the currently executed application or task instances 208A-208D, 210, 212 to enable selection some or all of the application or task instances 208A-208D, 210, 212. In another embodiment, after receiving the voice command, the user may directly be given an input dialog to choose a name and a storing location for the task file.

The solution illustrated in FIG. 2B enables a user to store a specific set of task instances to a task file for later user. For example, if a user is working on a specific project, the user is able to store various task instances of one or more applications relating to the projects in a task file. When the user wishes to resume working on the project, the user only needs to open the task file and all the task instances stored in the task file are opened. Thus the user does not have to separately start each of the task instances.

Figure 2C:
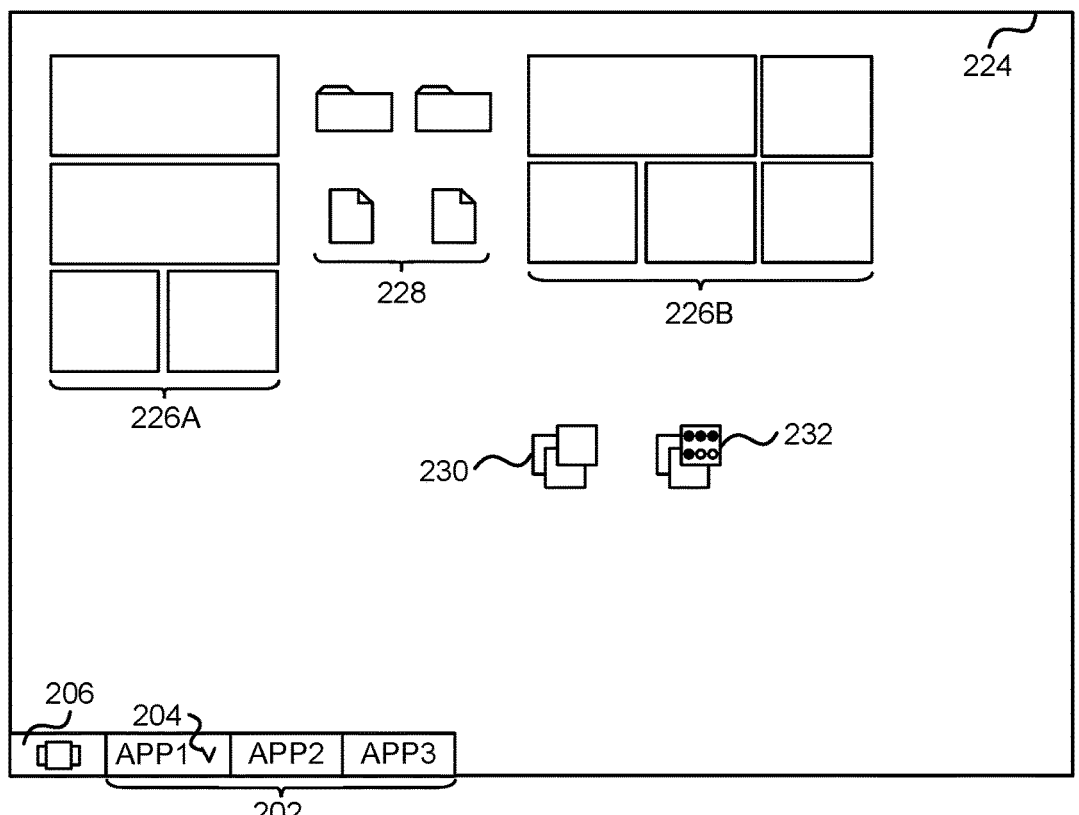
FIG. 2C is a simplified graphical user interface view on a display of an apparatus showing task files according to one embodiment.

FIG. 2C is a simplified graphical user interface view 224 on a display of an apparatus showing task files according to one embodiment. FIG. 2C illustrates some exemplary objects that an operating system of the apparatus may display. For example, the graphical user interface view 224 may comprises application groups 226A, 226B and a file group 228. And, as already illustrated in FIG. 2A, the graphical user interface view 224 may comprise a multitasking view button 206 and a task bar 202 indicating applications that are currently being executed. An indicator 204 in the task bar 202 may indicate that there are multiple instances of the application open simultaneously.

The graphical user interface view 224 also comprises task file icons 230, 232. The task files have been created earlier, for example, using the step illustrated in FIG. 2A or FIG. 2B. The task files 230, 232 store information needed by a user to later resume the applications or tasks included in the task files 230, 232. For example, the task files 230, 232 may include a file that the user was earlier processing or a link to the file. If a task in the task files 230, 232 involved playing back an audio or a video file, the task files 230, 232 may also store the point at which the user paused an earlier playback. In short, the task files 230, 232 comprise all the necessary information that is needed to execute the application or task instances again.

In general, a task file may comprise any information that allows a user to resume where the user left off. For example, a task file may comprise one or more of the following:
- the state of an application (i.e. what was done with the application and what view was showed to the user),
- the files (or other content) that the application is interacting with and the state of those files (or other content),
- the way the task or task instance was opened from and its position in a task flow (for example, if a user was reading an email and opens an image into an image editor, the image editor task should remember that it was opened from an email task).

In one embodiment, an icon of a task file 232 may indicate whether application or task instances stored in the task file 232 are currently executed or not. FIG. 2C illustrates one example for achieving this purpose. The icon of the task file 232 includes four small filled circles and two small non-filled circles. This provides an indication that four application or task instances are already being executed by the operating system and two application or task instances are not currently executed by the operating system. Although FIG. 2C illustrates that an icon can be used to indicate whether application or task instances stored in the task file 232 are currently executed or not, any other graphical indicator may be used instead. For example, a color or colors, animation, translucency, changes of label text etc. may be used to provide the indication.

The solution illustrated in FIG. 2C enables a user to start execution of multiple task instances by opening a single task file. Thus, when the user wishes to resume working, the user only needs to open the task file and all the task instances stored in the task file are opened. Thus the user does not have to separately start each of the task instances.

Figure 3:
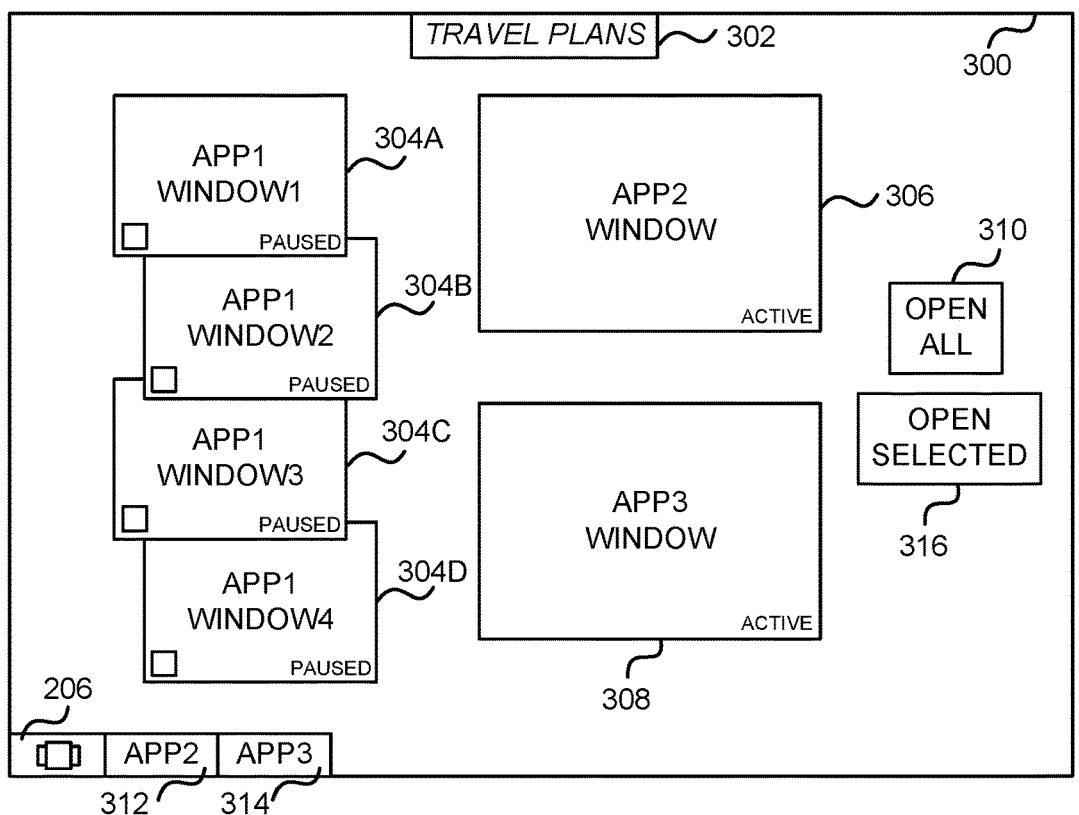
FIG. 3 is a simplified graphical user interface view on a display of an apparatus for resuming at least one application or task instance stored in a task file according to one embodiment.

FIG. 3 is a simplified graphical user interface view 300 on a display of an apparatus for resuming at least one application or task instance stored in a task file according to one embodiment. FIG. 3 illustrates some exemplary objects that an operating system of the apparatus may display. The graphical user interface view 300 may follow when a user has opened a task file 230, 232 illustrated in FIG. 2C. Application or task instances 304A-304D, 306, 308 may be displayed as thumbnails showing actual application views in a smaller scale where the application views reflect the time when the application or task instances were stored. Alternatively or additionally, some other identifying information may be provided in a thumbnail or close to it, for example, an application or a task name, the name of the file executed by the application instance, time of storing the task file etc. The graphical user interface view 300 may also identify a name 302 of the task file.

In one embodiment, as illustrated in FIG. 3, the thumbnails relating to each application or task instance indicate whether the application or task instances are already being executed. In FIG. 3, four application or task instances 304A-304D are not currently executed, therefore being in a "paused" state. The remaining two application or task instances 306, 308 are already being executed, as indicated by items 312 and 314 in a task bar. The thumbnails 306, 308 may also provide an indication "active" when the application or task instances 306, 308 are already being executed.

The graphical user interface view 300 may enable a user to open all application or task instances 304A-304D, 306, 308 via an "OPEN ALL" button 310. If the user has checked one or more checkboxes relating to the application or task instances 304A-304D, the user is able to open only the selected application or task instances via an "OPEN SELECTED" button 316. Instead of requiring a user to select of the "OPEN ALL" button 310 or the "OPEN SELECTED" button 316, a voice command may be received from the user to provide the selection.

By opening a task file, the user is able to easily resume execution of desired application or task instances. The user is able to continue working with the application or task instances where the user left off earlier.

Figure 4A:
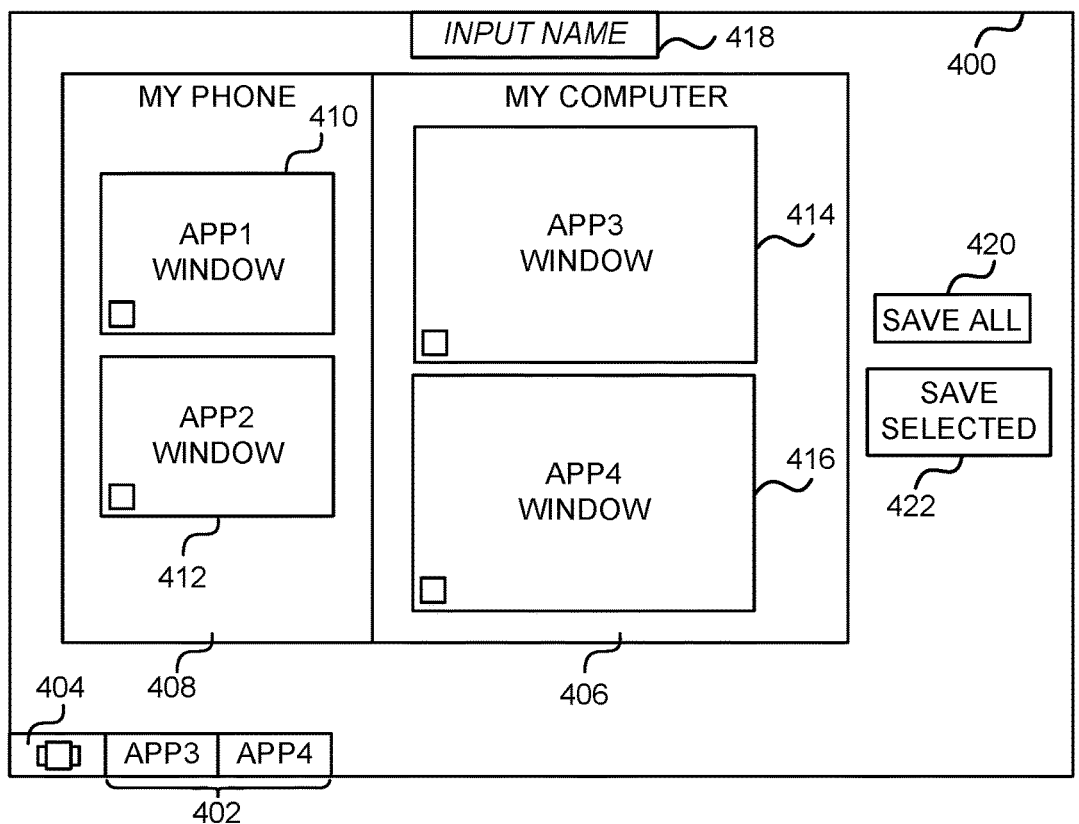
FIG. 4A is a simplified graphical user interface view on a display of an apparatus for storing task information according to one embodiment.

FIG. 4A is a simplified graphical user interface view 400 on a display of an apparatus for storing task information according to one embodiment. FIG. 4A illustrates some exemplary objects that an operating system of the apparatus may display. The apparatus is, for example, a mobile device, a smart phone, a laptop computer, or a personal computer. The graphical user interface view 400 may comprise a task bar 402 indicating applications that are already being executed by the apparatus.

In FIG. 4A, the graphical user interface view 400 comprises a multitasking view button 404, which when selected, may cause display of currently executed application or task instances in the graphical user interface. The embodiment illustrated in FIG. 4A differs from the embodiment illustrated in FIG. 2A in that here the graphical user interface view 400 displays application or task instances 410, 412, 414, 416 executed in multiple user devices. For example, "MY COMPUTER" 406 shows application or task instances 414, 416 currently executed by the user's personal computer or laptop computer. "MY PHONE" 408 shows application or task instances 410, 412 currently executed by the user's mobile phone. In this example, the computer displays the graphical user interface 400 and the user intends to store a task file in a memory of the computer. Although the graphical user interface view 400 here illustrates only two user devices, the graphical user interface view 400 may display application or task instances from more than two user devices. The various user devices may be part of the same ecosystem, and thus an operating system of the computer may receive synchronization data providing application or task instance information from other user devices.

The graphical user interface view 400 may provide an input field 418 for a user to input a name for a task file to be created. Fox example, if the application or task instances all relate to a single subject, the user may name the task file according to the subject, for example, "WORK PROJECT X". The user may also be provided a possibility 420 of choosing only some of the application or task instances 410, 412, 414, 416 to be included in the task file to be created. The desired application or task instances may be chosen by checking check boxes of each of the application or task instances. The user may also be provided a possibility 418 of including all the application or task instances 410, 412, 414, 416 in the task file to be created. In another embodiment, no separate buttons 420 and 422 are provided and the task file automatically includes all the application or task instances 410, 412, 414, 416 after the user has input the desired name for the task file. In one embodiment, no separate name input field 418 is provided, and when the user selects "SAVE SELECTED" 422 or "SAVE ALL" 422, the user is given the possibility of choosing a name and a storing location for the task file. Instead of requiring a user to select of the "SAVE ALL" button 420 or the "SAVE SELECTED" button 422, a voice command may be received from the user to provide the selection.

After the task file has been stored, the task file appears in a selected destination folder, for example, in the desktop as illustrated in FIG. 2C, in the user's computer as a regular file that can be opened later.

Figure 4B:
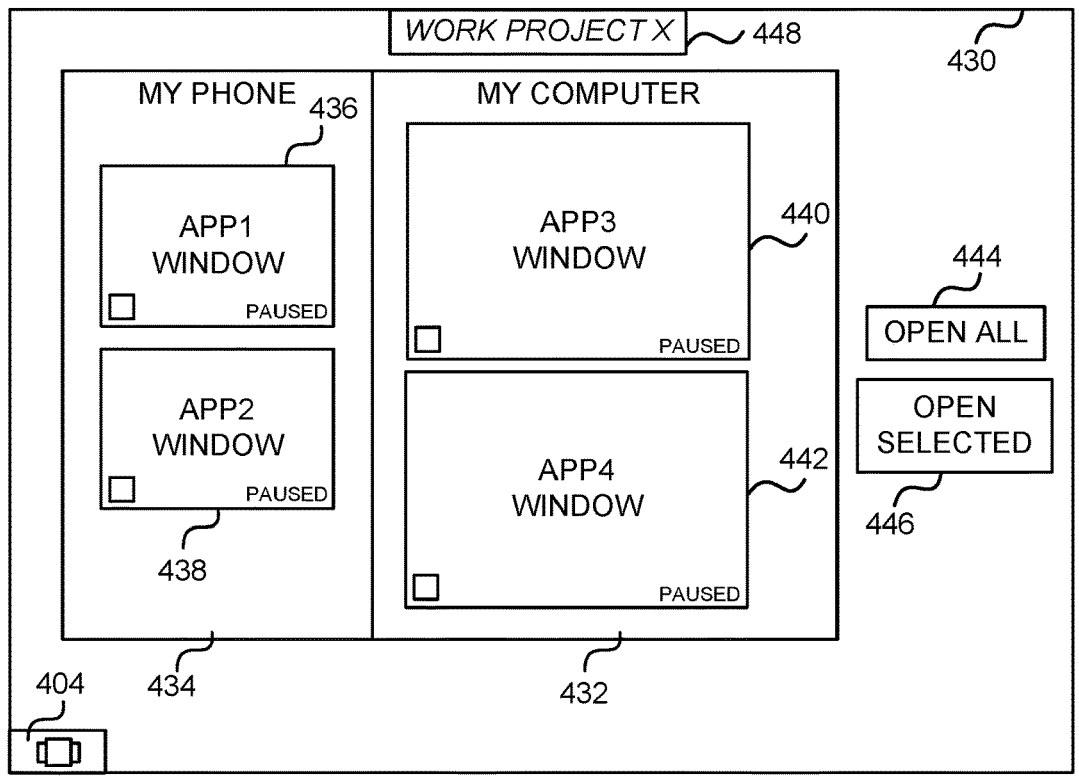
FIG. 4B is a simplified graphical user interface view on a display of an apparatus for resuming at least one application or task instance stored in a task file according to one embodiment.

FIG. 4B is a simplified graphical user interface view 430 on a display of an apparatus for resuming at least one application or task instance stored in a task file according to one embodiment. FIG. 4B illustrates some exemplary objects that an operating system of the apparatus may display. The embodiment illustrated in FIG. 4B differs from the embodiment illustrated in FIG. 3 in that here the graphical user interface view 430 displays application or task instances 436, 438, 440, 442 stored relating to multiple user device. For example, "MY COMPUTER" 432 shows application or task instances 440, 442 stored relating to the user's personal computer or laptop computer. "MY PHONE" 434 shows application or task instances 436, 438 stored relating to the user's mobile phone. In this example, the computer is acting as a primary device and the user opens a task file using the computer. Although the graphical user interface view 430 here illustrates only two user devices, the graphical user interface view 430 may display application or task instances from more than two user devices if the task file included data relating to more than two user devices. The various user devices may be part of the same ecosystem, and thus an operating system of the computer may be able to have a connection and control also other user devices of the ecosystem.

The graphical user interface view 430 may follow when a user has opened a task file 230, 232 illustrated in FIG. 2C. Application or task instances 436, 438, 440, 442 may be displayed as thumbnails showing actual application views in a smaller scale wherein the application views reflect the time when the application or task instances were stored. Alternatively or additionally, some other identifying information may be provided in a thumbnail or close to it, for example, an application or a task name, the name of the file executed by the application instance, time of storing the task file etc. The graphical user interface view 430 may also identify a name 448 of the task file ("WORD PROJECT X").

In one embodiment, as illustrated in FIG. 4B, the thumbnail relating to each application or task instance indicates whether the application or task instance is already being executed. In FIG. 4B, none of the application or task instances 436, 438, 440, 442 are executed at the moment, therefore being in a "paused" state.

The graphical user interface view 430 may enable a user to open all application or task instances 436, 438, 440, 442 via an "OPEN ALL" button 444. If the user has checked one or more checkboxes relating to the application or task instances 436, 438, 440, 442, the user is able to open only the selected application or task instances via an "OPEN SELECTED" button 446. Once the user has selected one or more of the application or task instances, they are executed again with user devices relating to them. For example, if the user selected the application or task instance 436, the operating system of the computer initiates execution of the application or task instance with the user's mobile phone. Instead of requiring a user to select of the "OPEN ALL" button 444 or the "OPEN SELECTED" button 446, a voice command may be received from the user to provide the selection.

FIGS. 4A and 4B illustrate a solution where the user is able to save to a task file application or task instances relating to multiple user devices. The user is also able resume execution of these application or task instances with the user devices via a simple selection via the graphical user interface or via a voice command.

Figure 5A:
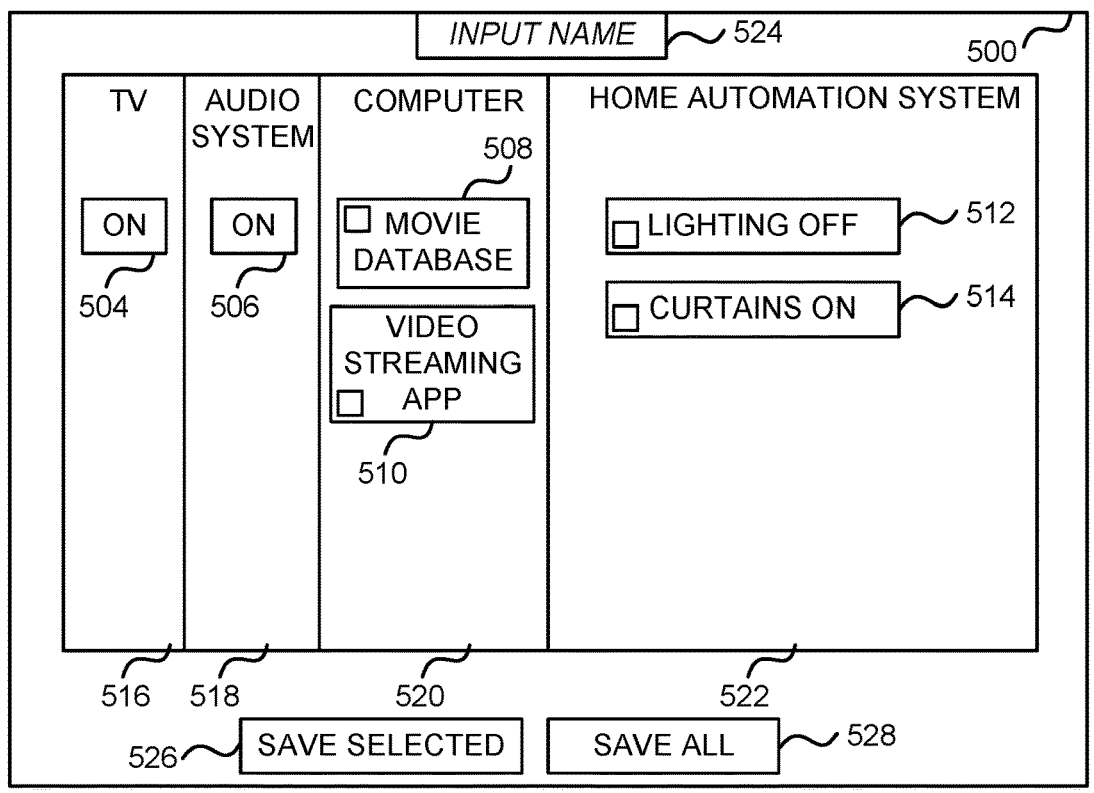
FIG. 5A is a simplified graphical user interface view on a display of an apparatus for storing task information relating to multiple devices according to one embodiment.

FIG. 5A is a simplified graphical user interface view 500 on a display of an apparatus for storing task information relating to multiple devices according to one embodiment. FIG. 5A illustrates some exemplary objects that an operating system of the apparatus may display.

In FIG. 5A, the graphical user interface view 500 displays executed application or task instances or device/system states 504-514 relating to multiple devices or systems in the graphical user interface. In this example, the graphical user interface view 500 is provided by a computer 520 and the computer 520 has a communication interface towards a television 516, an audio system 518 and a home automation system 522. Via the communication interface the computer 520 is able to determine states relating to the television 516, audio system 518 and the home automation system 522 and possibly also control the devices/systems. In this example, the computer 508 is able to determine that the television 516 and the audio system 518 are both switched on. The computer 508 is also able to determine, based on the information from the home automation system, the setup relating to lighting 512 and electric curtains 514. When the user watches, for example, a movie, the lights 512 are probable switched off and the electric curtains 514 are closed (i.e. blocking any incoming light). The computer 520 itself executes a video streaming application 510 and a web browser application with which a movie database page has been opened.

The graphical user interface view 500 may also provide an input field 524 for a user to input a name for a task file to be created. In this example, all the applications, tasks or states relate to watching a movie, the user may name the task file as "MOVIE SETUP". The user may also be provided a possibility 526 of choosing only some of the application or task instances 504, 506, 508, 510, 512, 514 to be included in the task file to be created. The desired application or task instances or states may be chosen, for example, by checking check boxes of each of the application or task instances. The user may also be provided a possibility 528 of including all the application or task instances or states 504, 506, 508, 510, 512, 514 in the task file to be created. In another embodiment, no separate buttons 526 and 528 are provided and the task file automatically includes all the application or task instances or states 504, 506, 508, 510, 512, 514 after the user has input the desired name for the task file. In one embodiment, no separate name input field 524 is provided, and when the user selects "SAVE SELECTED" 526 or "SAVE ALL" 528, the user is given the possibility of choosing a name and a storing location for the task file.

FIG. 5A provides a solution where via a single graphical user interface it is possible to store setup and state information relating to multiple devices and application or task instances into a task file.

Figure 5B:
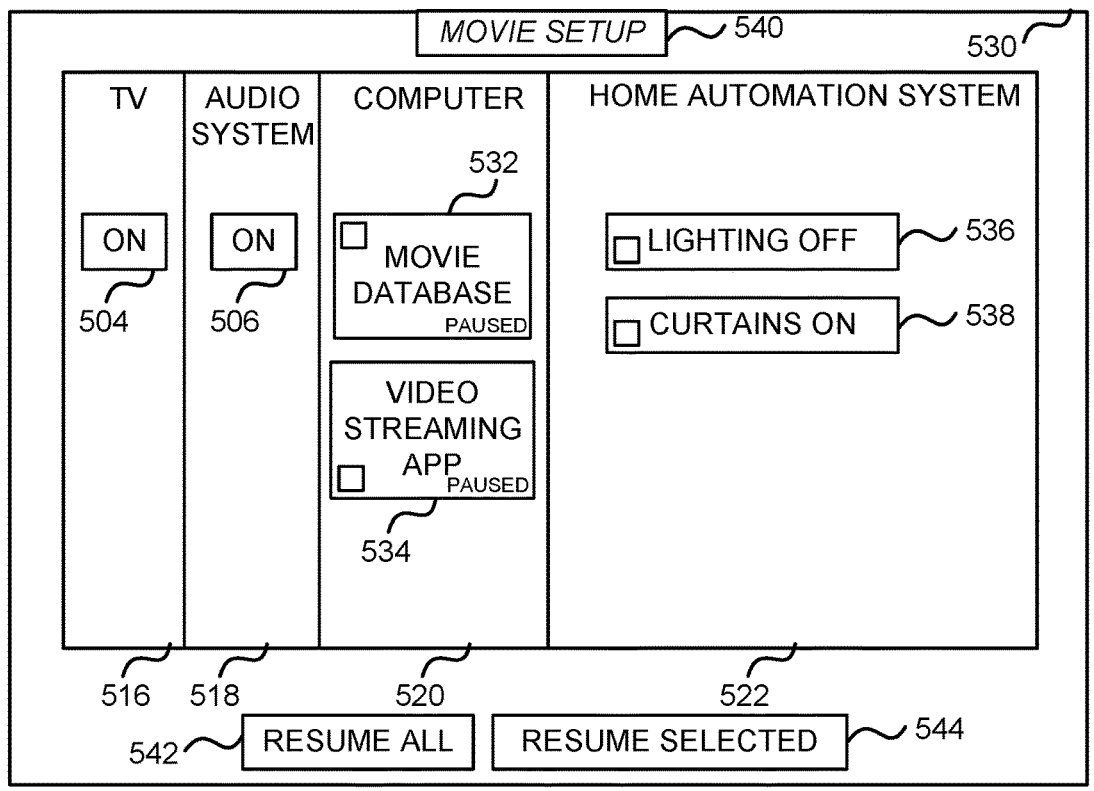
FIG. 5B is a simplified graphical user interface view on a display of an apparatus for resuming at least one application or task instance or state stored in a task file according to one embodiment.

FIG. 5B is a simplified graphical user interface view 530 on a display of an apparatus for resuming at least one application or task instance or state stored in a task file according to one embodiment. FIG. 5B illustrates some exemplary objects that an operating system of the apparatus may display.

The embodiment illustrated in FIG. 5B is provided after a task file created as illustrated in FIG. 5A is opened by a user. When the user wishes to resume watching a movie, the user opens the previously stored task file, for example, with his computer 520. The graphical user interface view 530 displays application or task instance or state information stored in the task file. In this example, the task file stores a specific setup relating to multiple different devices and systems. The graphical user interface view 530 may be provided by a computer 520 and the computer 520 has a communication interface towards one or more external devices, for example, a television 516, an audio system 518 and a home automation system 522. Via the communication interface the computer 520 is able to control functions of the external devices, i.e. the television 516, audio system 518 and the home automation system 522. The controlling refers, for example, to switch an external device on or off, to apply specific device settings, to control an external device to perform a specific task etc.

Application or task instances 532, 534 may be displayed as thumbnails showing actual application views in a smaller scale where the application views reflect the time when the application or task instances were stored. Alternatively or additionally, some other identifying information may be provided in a thumbnail or close to it, for example, an application or a task name, the name of the file executed by the application instance, time of storing the task file etc. The graphical user interface view 530 may also identify a name 540 of the task file ("MOVIE SETUP").

In one embodiment, as illustrated in FIG. 5B, the thumbnail relating to each application or task instance indicates whether the application or task instance is already being executed. In FIG. 5B, none of the application or task instances 532, 534 are executed at the moment, therefore being in a "paused" state.

The graphical user interface view 530 may enable a user to resume all application or task instances or states 504, 506, 508, 510, 512, 514 via an "RESUME ALL" button 542. If the user has checked one or more checkboxes relating to the application or task instances or states 532, 534, 536, 538, the user is able to resume only the selected application or task instances or states via an "RESUME SELECTED" button 544. Once the user has selected one or more of the application or task instances or states, they are executed or resumed again with devices or systems associated with them. The computer 520 is able to control the television 516, the audio system 518 and the home automation system 522 via the communication interface.

FIG. 5B provides a solution where via a single graphical user interface it is possible to resume a stored configuration of device and device states and to resume execution of one or more application or task instances via selection of a single task file.

Figure 6A:
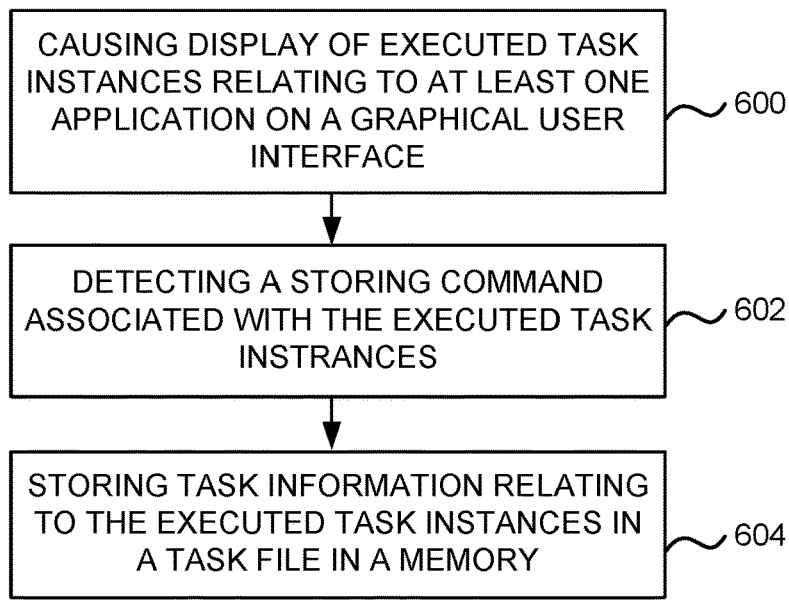
FIG. 6A illustrates a flow diagram of a method for storing task information in a task file according to one embodiment.

FIG. 6A illustrates a flow diagram of a method for storing task information in a task file according to one embodiment. For example, at least one processing unit may be connected to at least one memory, and the at least one memory stores program instructions that, when executed by the at least one processing unit, cause the apparatus to perform the method. Further, the method may be performed, for example, by an operating system of a device, for example, a computer or a mobile device.

At 600 display of executed task instances relating to at least one application on a graphical user interface is caused. The executed task instances may be displayed on the graphical user interface so that a thumbnail is separately provided for each task instance. Multiple task instances may relate to a single application. For example, multiple web browser windows are separate task instances of a web browser application.

At 602 a storing command associated with the executed task instances is detected. The storing command may be received by a selection of a function via the graphical user interface or alternatively via a voice command.

At 604 task information relating to the executed task instances is stored in a task file in a memory to enable a user to later resume execution of the task instances. The task file stores information needed by a user to later resume execution of the instances. For example, the task file may include a file that the user was earlier processing or a link to the file. If a task instance in the task file involved playing back an audio or a video file, the task file may also store the point at which the user paused an earlier playback. In short, the task file comprises all the necessary information that is needed to execute the task instances again at a later stage.

Figure 6B:
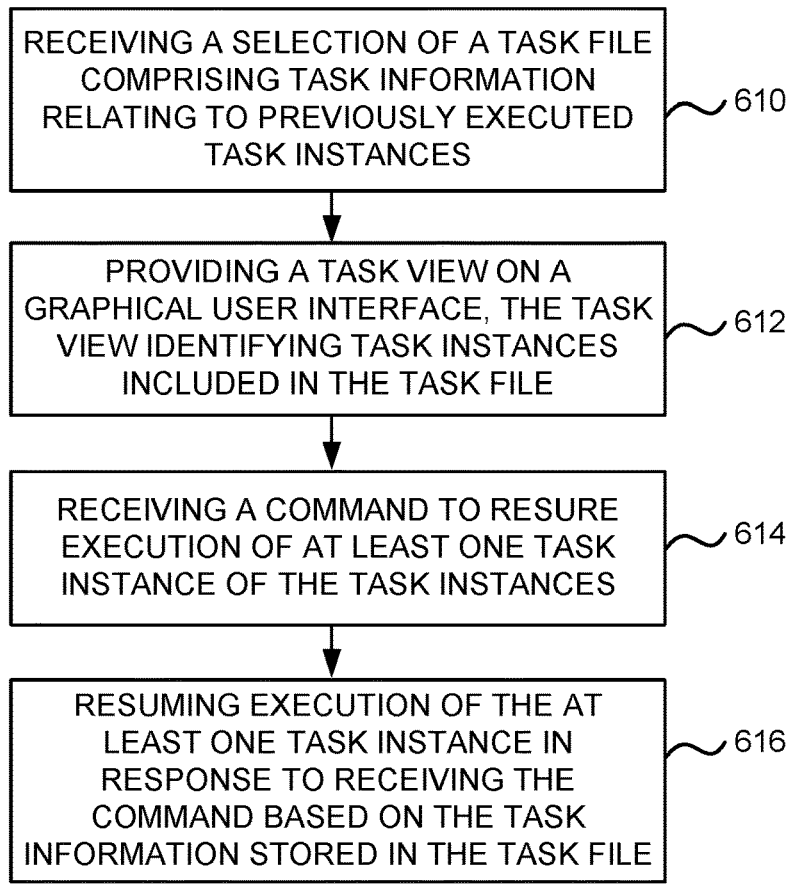
FIG. 6B illustrates a flow diagram of a method for executing at least one task instance based on information stored in a task file according to one embodiment.

FIG. 6B illustrates a flow diagram of a method for executing at least one task instance based on information stored in a task file according to one embodiment. For example, at least one processing unit may be connected to at least one memory, and the at least one memory stores program instructions that, when executed by the at least one processing unit, cause the apparatus to perform the method. Further, the method may be performed, for example, by an operating system of a device, for example, a computer or a mobile device.

At 610 a selection of a task file comprising task information relating to previously executed task instances is received. The task file stores information needed, after creation of the task file, to later resume execution of the task instances. For example, the task file may include a file that the user was earlier processing or a link to the file. If a task instance in the task file involved playing back an audio or a video file, the task file may also store the point at which the user paused an earlier playback. In short, the task file comprises all the necessary information that is needed to execute the task instances again at a later stage.

At 612 a task view is provided on a graphical user interface in response to the selection. The task view identifies task instances included in the task file. Multiple task instances may relate to a single application. For example, multiple web browser windows are separate task instances of a web browser application.

At 614 a command is received to resume execution of at least one task instance of the task instances. The command may be received by a selection of a function via the graphical user interface or alternatively via a voice command.

At 616 execution of the at least one task instance is resumed in response to receiving the command based on the task information stored in the task file.

Figure 6C:
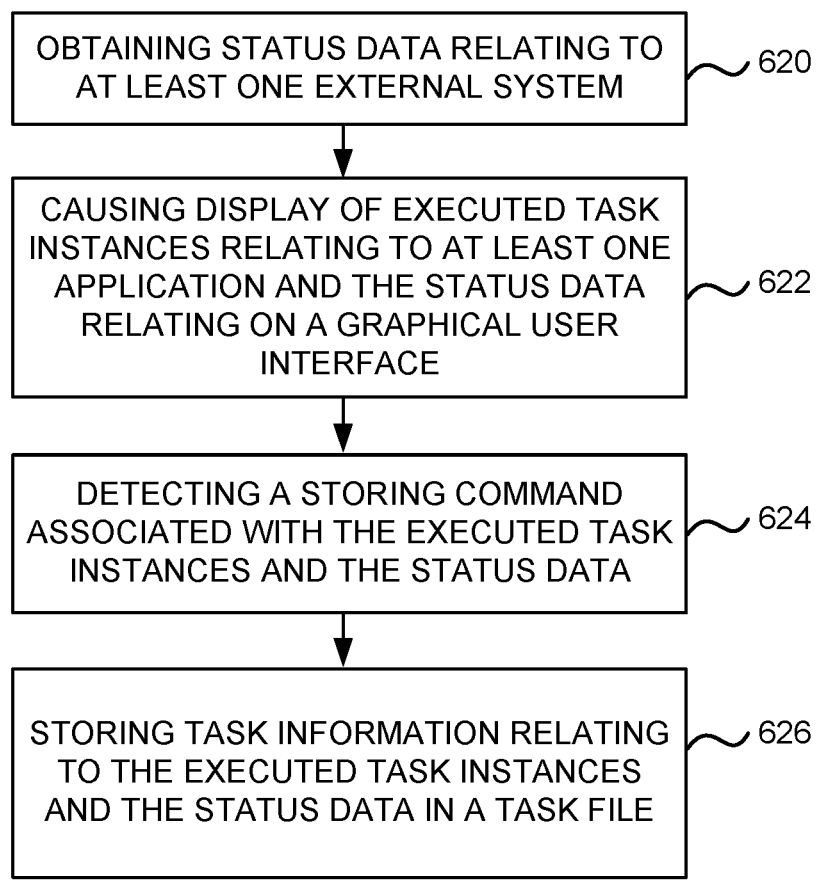
FIG. 6C illustrates a flow diagram of a method for storing task information in a task file according to one embodiment.

FIG. 6C illustrates a flow diagram of a method for storing task information in a task file according to one embodiment. For example, at least one processing unit may be connected to at least one memory, and the at least one memory stores program instructions that, when executed by the at least one processing unit, cause the apparatus to perform the method. Further, the method may be performed, for example, by an operating system of a device, for example, a computer or a mobile device.

At 620 status data relating to at least one external system is obtained. An external system refers, for example, to one or more linked devices, for example, a television, an audio system, a video disc player etc. The status data may indicate whether the devices are powered on, what input channel is currently used by the television etc. The external system may also refer to a home automation system that enables controlling various functions (for example, lighting etc.) relating to a home.

At 622 display of executed task instances relating to at least one application and the status data relating to the at least one external system is caused on a graphical user interface. Thus, the graphical user interface may display task instance information and status data relating to multiple devices or systems. Multiple task instances may relate to a single application. For example, multiple web browser windows are separate task instances of a web browser application.

At 624 a storing command associated with the executed task instances and the status data relating to the at least one external system is detected. The command may be received by a selection of a function via the graphical user interface or alternatively via a voice command.

At 626 task information relating to the executed task instances and the status data relating to the at least one external system is stored in a task file in a memory to enable a user to later resume execution of the task instances and control the at least one external system based on the status data. The task file stores information needed by a user to later resume execution of the instances. For example, the task file may include a file that the user was earlier processing or a link to the file. If a task instance in the task file involved playing back an audio or a video file, the task file may also store the point at which the user paused an earlier playback. In short, the task file comprises all the necessary information that is needed to execute the task instances again at a later stage and to control the at least one external system.

Any combination of the following examples is within the scope of the disclosure.

According to an aspect, there is provided an apparatus comprising at least one processing unit and at least one memory. The at least one memory stores program instructions that, when executed by the at least one processing unit, cause the apparatus to cause display of executed task instances relating to at least one application on a graphical user interface on a display, detect a storing command associated with the executed task instances, and store task information relating to the executed task instances associated with the storing command in a task file in the at least one memory for later resumption of execution of the task instances.

In an embodiment, the at least one memory stores program instructions that, when executed by the at least one processing unit, cause the apparatus to indicate with a graphical indicator relating to the task file whether the task instances are currently executed or not.

In an embodiment, in any combination with any of the above embodiments, the at least one memory stores program instructions that, when executed by the at least one processing unit, cause the apparatus to provide a task view on the graphical user interface, the task view comprising a thumbnail for each executed task instance.

In an embodiment, in any combination with any of the above embodiments, the at least one memory stores program instructions that, when executed by the at least one processing unit, cause the apparatus to provide a status bar on a graphical user interface, the status bar indicating the executed task instances, and detect the storing command as being addressed to the status bar.

In an embodiment, in any combination with any of the above embodiments, the at least one memory stores program instructions that, when executed by the at least one processing unit, cause the apparatus to detect the storing command via a voice command.

In an embodiment, in any combination with any of the above embodiments, the at least one memory stores program instructions that, when executed by the at least one processing unit, cause the apparatus to detect the storing command via the graphical user interface.

In an embodiment, in any combination with any of the above embodiments, the at least one memory stores program instructions that, when executed by the at least one processing unit, cause the apparatus to receive a selection of a subgroup of the executed task instances, and store task information relating to the subgroup of the executed task instances in the task file.

In an embodiment, in any combination with any of the above embodiments, the at least one memory stores program instructions that, when executed by the at least one processing unit, cause the apparatus to receive a selection of a task file comprising task information relating to previously executed task instances, provide a task view on the graphical user interface in response to the selection, the task view indicating task instances included in the task file, receive a command to resume execution of at least one of the task instances, and resume execution of the at least one of the task instances in response to receiving the command based on the task information stored in the task file.

In an embodiment, in any combination with any of the above embodiments, the task instances are executed by a single device.

In an embodiment, in any combination with any of the above embodiments, the task instances are executed by at least two devices.

According to another aspect, there is provided an apparatus comprising at least one processing unit and at least one memory. The at least one memory stores program instructions that, when executed by the at least one processing unit, cause the apparatus to receive a selection of a task file comprising task information relating to previously executed task instances via a graphical user interface displayed on a display, provide a task view on the graphical user interface in response to the selection, the task view identifying task instances included in the task file, receive a command to resume execution of at least one task instance of the task instances, and resume execution of the at least one task instance in response to receiving the command based on the task information stored in the task file.

In an embodiment, the at least one memory stores program instructions that, when executed by the at least one processing unit, cause the apparatus to receive the command to resume execution of the at least one task instance of the task instances via the graphical user interface.

In an embodiment, in any combination with any of the above embodiments, the at least one memory stores program instructions that, when executed by the at least one processing unit, cause the apparatus to receive the command to resume execution of the at least one task instance of the task instances via a voice command.

In an embodiment, in any combination with any of the above embodiments, the at least one memory stores program instructions that, when executed by the at least one processing unit, cause the apparatus to send control signaling to at least one external device to resume execution of at least one task instance.

In an embodiment, in any combination with any of the above embodiments, the task instances are executed by a single device.

In an embodiment, in any combination with any of the above embodiments, the task instances are executed by at least two devices.

In an embodiment, in any combination with any of the above embodiments, the at least one memory stores program instructions that, when executed by the at least one processing unit, cause the apparatus to indicate an execution state of each of the task instances in the task view.

In an embodiment, in any combination with any of the above embodiments, the task view comprises a thumbnail for each executed task instance.

According to another aspect, there is provided an apparatus comprising at least one processing unit and at least one memory. The at least one memory stores program instructions that, when executed by the at least one processing unit, cause the apparatus to obtain status data relating to at least one external system, cause display of executed task instances relating to at least one application and the status data relating to the at least one external system on a graphical user interface on a display, detect a storing command associated with the executed task instances and the status data relating to the at least one external system, and store task information relating to the executed task instances and the status data relating to the at least one external system in a task file in the at least one memory for later resumption of execution of the task instances and control of the at least one external system based on the status data.

In an embodiment, the at least one memory stores program instructions that, when executed by the at least one processing unit, cause the apparatus to provide a task view on the graphical user interface, the task view comprising a thumbnail for each executed task instance.

According to another aspect, there is provided a method comprising causing display of executed task instances relating to at least one application on a graphical user interface, detecting a storing command associated with the executed task instances, and storing task information relating to the executed task instances associated with the storing command in a task file in the at least one for later resumption of execution of the task instances.

In an embodiment, the method further comprises indicating with a graphical indicator relating to the task file whether the task instances are currently executed or not.

In an embodiment, in any combination with any of the above embodiments, the method further comprises providing a task view on the graphical user interface, the task view comprising a thumbnail for each executed task instance.

In an embodiment, in any combination with any of the above embodiments, the method further comprises providing a status bar on the graphical user interface, the status bar indicating the executed task instances, and detecting the storing command as being addressed to the status bar.

In an embodiment, in any combination with any of the above embodiments, the method further comprises detecting the storing command via a voice command.

In an embodiment, in any combination with any of the above embodiments, the method further comprises detecting the storing command via the graphical user interface.

In an embodiment, in any combination with any of the above embodiments, the method further comprises receiving a selection of a subgroup of the executed task instances, and storing task information relating to the subgroup of the executed task instances in the task file.

In an embodiment, in any combination with any of the above embodiments, the method further comprises receiving selection of a task file comprising task information relating to previously executed task instances, providing a task view on the graphical user interface in response to the selection, the task view indicating task instances included in the task file, receiving a command to resume execution of at least one of the task instances, and resuming execution of the at least one of the task instances in response to receiving the command based on the task information stored in the task file.

In an embodiment, in any combination with any of the above embodiments, the task instances are executed by a single device.

In an embodiment, in any combination with any of the above embodiments, the task instances are executed by at least two devices.

According to another aspect, there is provided a method comprising receiving selection of a task file comprising task information relating to previously executed task instances via a graphical user interface displayed on a display, providing a task view on the graphical user interface in response to the selection, the task view identifying task instances included in the task file, receiving a command to resume execution of at least one task instance of the task instances, and resuming execution of the at least one task instance in response to receiving the command based on the task information stored in the task file.

In an embodiment, the method further comprises receiving the command to resume execution of the at least one task instance of the task instances via the graphical user interface.

In an embodiment, in any combination with any of the above embodiments, the method further comprises receiving the command to resume execution of the at least one task instance of the task instances via a voice command.

In an embodiment, in any combination with any of the above embodiments, the method further comprises sending control signaling to at least one external device to resume execution of at least one task instance.

In an embodiment, in any combination with any of the above embodiments, the task instances are executed by a single device.

In an embodiment, in any combination with any of the above embodiments, the task instances are executed by at least two devices.

In an embodiment, in any combination with any of the above embodiments, the method further comprises indicating an execution state of each of the task instances in the task view.

In an embodiment, in any combination with any of the above embodiments, the task view comprises a thumbnail for each executed task instance.

According to another aspect, there is provided a method comprising obtaining status data relating to at least one external system, causing display of executed task instances relating to at least one application and the status data relating to the at least one external system on a graphical user interface on a display, detecting a storing command associated with the executed task instances and the status data relating to the at least one external system, and storing task information relating to the executed task instances and the status data relating to the at least one external system in a task file in the at least one memory for later resumption of execution of the task instances and control of the at least one external system based on the status data.

According to another aspect, there is provided a computer program comprising program code, which when executed by at least one processor, causes an apparatus to cause display of executed task instances relating to at least one application on a graphical user interface, detect a storing command associated with the executed task instances, and store task information relating to the executed task instances associated with the storing command in a task file in the at least one memory for later resumption of execution of the task instances.

According to another aspect, there is provided a computer-readable medium comprising a computer program comprising program code, which when executed by at least one processor, causes an apparatus to cause display of executed task instances relating to at least one application on a graphical user interface on a display, detect a storing command associated with the executed task instances, and store task information relating to the executed task instances associated with the storing command in a task file in the at least one for later resumption of execution of the task instances.

According to another aspect, there is provided a computer program comprising program code, which when executed by at least one processor, causes an apparatus to receive a selection of a task file comprising task information relating to previously executed task instances via a graphical user interface displayed on a display, provide a task view on the graphical user interface in response to the selection, the task view identifying task instances included in the task file, receive a command to resume execution of at least one task instance of the task instances, and resume execution of the at least one task instance in response to receiving the command based on the task information stored in the task file.

According to another aspect, there is provided a computer-readable medium comprising a computer program comprising program code, which when executed by at least one processor, causes an apparatus to receive a selection of a task file comprising task information relating to previously executed task instances via a graphical user interface displayed on a display, provide a task view on the graphical user interface in response to the selection, the task view identifying task instances included in the task file, receive a command to resume execution of at least one task instance of the task instances, and resume execution of the at least one task instance in response to receiving the command based on the task information stored in the task file.

According to another aspect, there is provided a computer program comprising program code, which when executed by at least one processor, causes an apparatus to obtain status data relating to at least one external system, cause display of executed task instances relating to at least one application and the status data relating to the at least one external system on a graphical user interface on a display, detect a storing command associated with the executed task instances and the status data relating to the at least one external system, and store task information relating to the executed task instances and the status data relating to the at least one external system in a task file in the at least one memory for later resumption of execution of the task instances and control of the at least one external system based on the status data.

According to another aspect, there is provided a computer-readable medium comprising a computer program comprising program code, which when executed by at least one processor, causes an apparatus to obtain status data relating to at least one external system, cause display of executed task instances relating to at least one application and the status data relating to the at least one external system on a graphical user interface on a display, detect a storing command associated with the executed task instances and the status data relating to the at least one external system, and store task information relating to the executed task instances and the status data relating to the at least one external system in a task file in the at least one memory for later resumption of execution of the task instances and control of the at least one external system based on the status data.

According to another aspect, there is provided an apparatus comprising means for causing display of executed task instances relating to at least one application on a graphical user interface on a display, means for detecting a storing command associated with the executed task instances, and means for storing task information relating to the executed task instances associated with the storing command in a task file in the at least one memory for later resumption of execution of the task instances.

According to another aspect, there is provided an apparatus comprising means for receiving selection of a task file comprising task information relating to previously executed task instances via a graphical user interface displayed on a display, means for providing a task view on the graphical user interface in response to the selection, the task view identifying task instances included in the task file, means for receiving a command to resume execution of at least one task instance of the task instances, and means for resuming execution of the at least one task instance in response to receiving the command based on the task information stored in the task file.

According to another aspect, there is provided an apparatus comprising means for obtaining status data relating to at least one external system, means for causing display of executed task instances relating to at least one application and the status data relating to the at least one external system on a graphical user interface on a display, means for detecting a storing command associated with the executed task instances and the status data relating to the at least one external system, and means for storing task information relating to the executed task instances and the status data relating to the at least one external system in a task file in the at least one memory for later resumption of execution of the task instances and control of the at least one external system based on the status data.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include disks, thumb drives, memory etc. and do not include propagated signals. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus comprising:
   at least one processing unit;
   at least one memory;
   wherein the at least one memory stores program instructions that, when executed by the at least one processing unit, cause the apparatus to:
   identify a set of task instances executed on a plurality of computing devices, the set of executed task instances corresponding to applications executed on the plurality of computing devices;
   receive, from one or more users, a request to store task information related to a subset of the set of executed task instances in a selected task file from a plurality of task files, the task information comprising a state of each of the subset of the set of executed task instances at the time of the request;
   store the task information relating to the subset of the set of executed task instances in the selected task file in the at least one memory for later resumption of execution of the set of task instances; and
   upon a selection of the selected task file on one of the plurality of computing devices, open the subset of the set of executed task instances in the state of each of the subset of the set of executed task instances at the time of the request on the respective computing device on a graphical user interface of the one of the plurality of computing devices.

2. An apparatus of claim 1, wherein each of the set of executed task instances represent a separate web browser application window that includes one or more active web pages.

3. An apparatus of claim 1, wherein the at least one memory stores program instructions that, when executed by the at least one processing unit, cause the apparatus to:
   identify at least one task instance relating to an application not currently being executed on the plurality of computing devices;
   receive, from the one or more users, a request to store task information related to the at least one task instance in the selected task file from a plurality of task files;
   store the task information relating to the at least one task instance in the selected task file in the at least one memory for later resumption of execution of the at least one task instance and the task instances; and
   upon a selection of the selected task file on one of the plurality of computing devices, open the subset of the executed task instances and the at least one task instance in the state of each of the subset of the executed task instances and the at least one task instance at the time of the request on the respective computing device on a graphical user interface of the one of the plurality of computing devices.

4. An apparatus of claim 1, wherein the at least one memory stores program instructions that, when executed by the at least one processing unit, cause the apparatus to:
   provide a status bar on the graphical user interface, the status bar indicating the subset of the set of executed task instances; and
   detect the request as a storing command being addressed to the status bar.

5. An apparatus of claim 1, wherein the at least one memory stores program instructions that, when executed by the at least one processing unit, cause the apparatus to:
   detect the request as a storing command via a voice command.

6. An apparatus of claim 1, wherein the at least one memory stores program instructions that, when executed by the at least one processing unit, cause the apparatus to:
   detect the request as a storing command via the graphical user interface.

7. An apparatus of claim 1, wherein the at least one memory stores program instructions that, when executed by the at least one processing unit, cause the apparatus to:
   receive a selection of a subgroup of the executed task instances; and
   store task information relating to the subgroup of the executed task instances in the task file.

8. An apparatus of claim 1, wherein the at least one memory stores program instructions that, when executed by the at least one processing unit, cause the apparatus to:
   receive a selection of a task file comprising task information relating to previously executed task instances;
   provide a task view on the graphical user interface in response to the selection, the task view indicating task instances included in the task file;
   receive a command to resume execution of at least one of the task instances; and
   resume execution of the at least one of the task instances in response to receiving the command based on the task information stored in the task file.

9. An apparatus of claim 1, wherein the task instances are executed by a single device.

10. An apparatus of claim 1, wherein the request is to store task information related to only the subset of the set of executed task instances in the selected task file from a plurality of task files.

11. An apparatus comprising:
at least one processing unit;
at least one memory;
wherein the at least one memory stores program instructions that, when executed by the at least one processing unit, cause the apparatus to:
receive, from one or more users, a request to store task information related to a subset of previously executed set of task instances in a selected task file from a plurality of task files, the task information comprising a state of each of the subset of the previously executed set of task instances at the time of the request;
receive a selection of the selected task file from the plurality of task files, wherein the selected task file comprises the state of each task instance in the subset of the set of previously executed task instances at a time of the task file was stored, wherein the subset of the set of previously executed task instances were previously executed on a plurality of computing devices;
provide a task view on the graphical user interface in response to the selection, the task view identifying the subset of the set of previously executed task instances included in the task file;
receive a command to resume execution of the subset of the set of previously executed task instances on a respective computing device of the plurality of computing devices; and
resume execution of the subset of the set of previously executed task instances on one of the plurality of computing devices in response to receiving the command from the one of the plurality of computing devices based on the task information stored in the selected task file, wherein resuming execution comprises opening the subset of the set of previously executed task instances in the state of each of the task instances in the subset of the set of previously executed task instances on the respective computing device at the time of storing the task file.

12. An apparatus of claim 11, wherein the at least one memory stores program instructions that, when executed by the at least one processing unit, cause the apparatus to:
receive the command to resume execution of at least one task instance of the subset of set of previously executed task instances via the graphical user interface.

13. An apparatus of claim 11, wherein the at least one memory stores program instructions that, when executed by the at least one processing unit, cause the apparatus to:
receive the command to resume execution of at least one task instance of the subset of the set of previously executed task instances via a voice command.

14. An apparatus of claim 11, wherein the at least one memory stores program instructions that, when executed by the at least one processing unit, cause the apparatus to:
send control signaling to at least one external device to resume execution of at least one task instance.

15. An apparatus of claim 11, wherein the subset of the set of previously executed task instances were executed by a single device.

16. An apparatus of claim 11, wherein each of the task instances in the subset of the set of previously executed task instances represent a separate application.

17. An apparatus of claim 11, wherein the at least one memory stores program instructions that, when executed by the at least one processing unit, cause the apparatus to:
indicate an execution state of each of the subset of the set of previously executed task instances in the task view.

18. An apparatus of claim 11, wherein the request is to store task information related to only the subset of previously executed task instances in the selected task file from the plurality of task files.

19. An apparatus comprising:
at least one processing unit;
at least one memory;
wherein the at least one memory stores program instructions that, when executed by the at least one processing unit, cause the apparatus to:
obtain status data relating to at least one external system;
identify set of task instances executed on a plurality of computing devices, the set of task instances corresponding to a subset of a plurality of applications executed on a plurality of computing devices and the status data relating to the at least one external system;
provide a task view on the graphical user interface for each of the identified set of task instances;
receive, from one or more users, a request to store task information related to the identified set of task instances in a single task file from a plurality of task files, the task information comprising a state of each of the subset of the set of executed task instances at the time of the request;
store the task information relating to the identified set of task instances and the status data relating to the at least one external system in the single task file in the at least one memory for later resumption of execution of the identified set of task instances and control of the at least one external system based on the status data, wherein storing the task information includes the state of each of the identified set of task instances at a time of the detected storing command on a respective computing device of the plurality of computing devices, wherein each of the identified set of task instances represent a separate application; and
upon a selection of the single task file on one of the plurality of computing devices, open the identified set of task instances in the state of each of the identified set of task instances at the time of the detected storing command on the respective computing device on a graphical user interface of the one of the plurality of computing devices, wherein opening the identified set of task instances comprises resuming execution of the identified set of task instances at a same point the identified set of task instances had previously stopped being executed on the respective computing devices.

20. An apparatus of claim 19, wherein the request is to store task information related to only the subset of the set of task instances executed on the plurality of applications executed on a plurality of computing devices.

* * * * *